United States Patent
Suzuki

(10) Patent No.: US 6,247,030 B1
(45) Date of Patent: Jun. 12, 2001

(54) TABLE EDITING APPARATUS

(75) Inventor: Akira Suzuki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/115,771

(22) Filed: Jul. 15, 1998

(30) Foreign Application Priority Data

Jul. 18, 1997 (JP) .................................................. 9-209786

(51) Int. Cl.⁷ ...................................................... G06F 17/21
(52) U.S. Cl. ............................................................... 707/509
(58) Field of Search ............................... 707/7, 102, 503, 707/509, 517

(56) References Cited

U.S. PATENT DOCUMENTS

| | | | |
|---|---|---|---|
| 5,379,372 | * | 1/1995 | Wu ........................ 707/509 |
| 5,557,787 | * | 9/1996 | Shin et al. ............. 707/102 |
| 5,615,366 | * | 3/1997 | Hansen ...................... 707/7 |
| 5,835,916 | * | 10/1998 | Inaki et al. ............ 707/509 |
| 5,880,742 | * | 3/1999 | Rao et al. ............... 707/503 |
| 5,933,833 | * | 8/1999 | Musashi ................. 707/102 |
| 6,006,240 | * | 12/1999 | Handley ................. 707/510 |

FOREIGN PATENT DOCUMENTS

| | | |
|---|---|---|
| 59-57326 | 4/1984 | (JP) . |
| 2-236773 | 9/1990 | (JP) . |
| 2-289057 | 11/1990 | (JP) . |

* cited by examiner

*Primary Examiner*—Joseph H. Feild
(74) *Attorney, Agent, or Firm*—Oliff & Berridge, PLC

(57) ABSTRACT

In view of supporting the table edition while keeping correspondence between the set of headings and data corresponding to such set and reducing the cost required for table edition, the table editing apparatus comprises a heading editing unit for accepting the heading editing designation to edit the heading of table, a mapping storing designating unit for designating storing of mapping, a mapping offering unit for accepting the mapping storing designation to store the mapping in regard to the table when the designation is accepted, a data arrangement designating unit for designating data arrangement and a data arrangement unit for accepting the data arrangement designation and determining the data to be arranged in the cell on the basis of the mapping for each cell of the data part of the table, to conduct the data arrangement with reference to the mapping at the time when the data arrangement unit has designated storing of mapping after a user has edited the heading for the edition of table. Thereby, cost of user for keeping the correspondence in the course of the edition can be reduced.

19 Claims, 19 Drawing Sheets

|  | Yamagata | | Miyagi | |
| --- | --- | --- | --- | --- |
|  | Engineering | Arts | Engineering | |
| Primary School |  |  |  | Ishinomaki Primary School |
| University | Yamagata Engineering University | Tohoku University of Arts | Tohoku Industrial University | Tohoku University |

Table before edition

FIG. 1

| | Yamagata | | Miyagi | |
|---|---|---|---|---|
| Primary School | | | Ishinomaki Primary School | |
| University | Engineering | Yamagata Engineering University | Tohoku Industrial University | |
| | Arts | Tohoku University of Arts | | |
| | | | | Tohoku University |

Table after edition

FIG. 2

| Set of Headings | Data |
|---|---|
| {Yamagata, Engineering, Primary School} | |
| {Yamagata, Engineering, University} | Yamagata Engineering University |
| {Yamagata, Arts, Primary School} | |
| {Yamagata, Arts, University} | Tohoku University of Arts |
| {Miyagi, Engineering, Primary School} | |
| {Miyagi, Engineering, University} | Tohoku Industrial University |
| {Miyagi, Primary School} | Ishinomaki Primary School |
| {Miyagi, University} | Tohoku University |

Mapping Offering Unit

FIG. 4

| Set of Headings | Data |
|---|---|
| {Miyagi , University} | Tohoku University |

Mapping Offering Unit

FIG. 7

|  |  | Yamagata | Miyagi |
|---|---|---|---|
| Primary School | | | |
| University | Engineering | | |
| | Arts | | |
| | | | |

Table before data arrangement

FIG. 8

|  | Yamagata | Miyagi |
|---|---|---|
| Primary School | | |
| University — Engineering | | |
| University — Arts | | Tohoku University |

Table during data arrangement

FIG. 9

| | IPC | Applicant |
|---|---|---|
| Japanese Published Unexamined Patent Application No. Hei 6-123xx | G06F 15/22 | A Corporation |
| Japanese Published Unexamined Patent Application No. Hei 6-124xx | G06F 15/22 | B Corporation |
| Japanese Published Unexamined Patent Application No. Hei 6-125xx | G06F 19/00 | C Corporation |

Table before edition

FIG. 12

| Set of Headings | Data |
|---|---|
| {IPC, Japanese Published Unexamined Patent Application No. Hei 6-123xx} | GO6F 15/22 |
| {IPC, Japanese Published Unexamined Patent Application No. Hei 6-124xx} | GO6F 15/22 |
| {IPC, Japanese Published Unexamined Patent Application No. Hei 6-125xx} | GO6F 19/00 |
| {Applicant, Japanese Published Unexamined Patent Application No. Hei 6-123xx} | A Corporation |
| {Applicant, Japanese Published Unexamined Patent Application No. Hei 6-124xx} | B Corporation |
| {Applicant, Japanese Published Unexamined Patent Application No. Hei 6-125xx} | C Corporation |

Mapping Offering Unit

FIG. 13

| | IPC | Applicant |
|---|---|---|
| Japanese Published Unexamined Patent Application No. Hei 6-123xx | | |
| Japanese Published Unexamined Patent Application No. Hei 6-124xx | | |
| Japanese Published Unexamined Patent Application No. Hei 6-125xx | | |
| Japanese Published Unexamined Patent Application No. Hei 6-126xx | | |

Before data arrangement

FIG. 14

| Expected Data List |
|---|
| G06F 15/22 |
| G06F 15/22 |
| G06F 19/00 |
| A Corporation |
| B Corporation |
| C Corporation |

Expected Data List

FIG. 15

| Expected Data List |
|---|
| GO6F 15/22, GO6F 15/22, GO6F 19/00<br>A Corporation, B Corporation, C Corporation |

Expected Data List

FIG. 16

| Expected Data List |
|---|
| GO6F 15/22, GO6F 15/22,<br>GO6F 19/00<br>A Corporation, B Corporation, C Corporation |

Expected Data List

FIG. 17

| Expected Data List |
|---|
| GO6F 15/22 |
| GO6F 19/00 |
| A Corporation, B Corporation, C Corporation |

Expected Data List

FIG. 18

| | IPC | Applicant |
|---|---|---|
| Japanese Published Unexamined Patent Application No. Hei 6-123xx | | |
| Japanese Published Unexamined Patent Application No. Hei 6-124xx | | |
| Japanese Published Unexamined Patent Application No. Hei 6-125xx | | |
| Japanese Published Unexamined Patent Application No. Hei 6-126xx | G06F 15/22 | |

Table during data arrangement

FIG. 19

| Expected Data List |
|---|
| A Corporation, B Corporation, C Corporation G06F 15/22, G06F 15/22, G06F 19/00 |

Expected Data List

FIG. 20

| Expected Data List |
|---|
| A Corporation, B Corporation, C Corporation G06F 15/22, G06F 15/22, G06F 19/00 |

Expected Data List

FIG. 21

| Expected Data List |
|---|
| A Corporation, B Corporation, C Corporation<br>GO6F 15/22,<br>GO6F 19/00 |

Expected Data List

FIG. 22

| Please Select |||
|---|---|---|
| A Corporation | B Corporation | C Corporation |
| GO6F 15/22, |||
| GO6F 19/00 |||

Data Selecting Unit

FIG. 23

| | IPC | Applicant |
|---|---|---|
| Japanese Published Unexamined Patent Application No. Hei 6-123xx | | |
| Japanese Published Unexamined Patent Application No. Hei 6-124xx | | |
| Japanese Published Unexamined Patent Application No. Hei 6-125xx | | |
| Japanese Published Unexamined Patent Application No. Hei 6-126xx | G06F 15/22 | B Corporation |

Table during data arrangement

FIG. 24

TABLE EDITING APPARATUS

BACKGROUND OF THE INVENTION

1. Field of the Invention

The present invention relates to an apparatus which allows a user to freely edit the table describing the data in correspondence to its heading using a mapping which is a set of pairs and each pair consists of H and D where H is a set of headings and D is data which corresponds to the headings.

2. Description of the Related Art

In these years, the table generating function is essential for the document processing apparatus. In a simplified apparatus of the related art, a user draws ruled lines with a segment of ruled line and arranges a text data to each cell of the divided table.

In this apparatus, since the ruled line is not isolated from the text in the cell, it is inevitable that redrawing of ruled line and edition of text in the cell are often generated at the time of edition of the table and thereby a user has expended useless time.

In regard to the table edition, following has respectively been known as a typical apparatus described in the Japanese Published Unexamined Patent Application No. SHO 59-57326 in which the continuous regions in the vertical and horizontal directions (namely, rows and columns) divided during formation of the table are processed as one group and moving and deletion are conducted in unit of this region, the apparatus described in the Japanese Published Unexamined Patent Application No. HEI 2-236773 in which when a couple of cells are selected, contents of these two cells are replaced with each other, and the apparatus described in the Japanese Published Unexamined Patent Application No. HEI 2-289057 in which a table as a whole are structured by sequentially coupling the cells in the tables in one dimension and insertion, copying and deletion of cells are conducted by changing coupling relation of cells in the edition of table.

With the technology explained above, edition in unit of cell, row and column is possible but complicated procedures are required even for a little complicated edition of tables.

For example, when it is attempted to obtain the table shown in FIG. 2 by changing the layout of the table shown in FIG. 1, a remarkable cost will be required for edition because there is no common rows and columns between these two tables and arrangement of texts in the cells is quite different.

The table having the row heading and column heading as shown in FIG. 1 indicates, in place of mere uniform data arrangement on the matrix, the correspondence between set of items belonging to "heading" and items belonging to "data " other than the heading, for example, correspondence between set of items of "Yamagata, Engineering, University" belonging to heading and the item of "Yamagata Engineering University" belonging to the data. Since the table indicates this correspondence, this correspondence is almost stored in the ordinary edition of table, unless the table is changed to the table indicating different data. In actual, layout is certainly different to a large extent but this correspondence is still stored between the table of FIG. 1 and the table of FIG. 2.

However, in the table editing technology of the related art, since any consideration is not taken into account for storing of this correspondence, a user is required to maintain the correspondence in the course of the edition of table and thereby complicated manipulation has been left to a user side.

OBJECT AND SUMMARY OF THE INVENTION

The present invention has been proposed considering the background explained above and it is therefore an object of the present invention to provide a table editing apparatus which supports table edition while keeping the correspondence between set of headings and the data corresponding to such set.

In the table editing apparatus of the present invention, a mapping for table (namely, "set including an element consisting of set of headings of table and data corresponding to the headings") is stored and when a heading of the table is edited, the data to be arranged in a cell is determined for each cell of the data part, as a part other than the heading of the table, on the basis of such mapping.

Namely, the table editing apparatus of the present invention comprises a heading editing unit for accepting the heading editing designation to edit the heading of table, a mapping storing designating unit for designating storing of mapping, a mapping offering unit for accepting the mapping storing designation from the mapping storing designating unit to hold the mapping regarding the table when such designation is accepted, a data arrangement designating unit for designating data arrangement and a data arrangement unit for accepting the data arrangement designation from the data arrangement designating unit to determine how the data to should be arranged within a cell depending on the heading corresponding to such cell and mapping offered from the mapping offering unit.

Thereby, after a user has edited the heading during the table edition, the data arrangement unit arranges the data by referring to the mapping in such a timing that the mapping storing is designated. Therefore, user cost for keeping the correspondence in the course of editing may be alleviated.

Moreover, data arrangement by the data arrangement unit is detected by the mapping storing designating unit and after the data arrangement, the mapping storing designating unit designates storing of mapping to the mapping offering unit.

Thereby, after the first heading edition, the mapping in the table before edition is always held automatically, at the time of the heading edition, in the mapping offering unit. Therefore, the data arrangement unit can always refer to the latest mapping.

Moreover, the mapping storing designating unit detects the heading editing designation for the heading editing unit and the mapping storing designating unit designates the mapping storing to the mapping designating unit before edition of heading by the heading editing unit.

Thereby, since the mapping in the table before edition is always held in the mapping offering unit at the time of editing the heading, the data arrangement unit can always refer to the latest mapping.

Here, it is thought in the edition of heading that a certain heading is moved by a couple of editing processes of "cut" and "paste". On the occasion of conducting this edition, in the apparatus where the mapping immediately before the edition is automatically held in a mapping offering unit, since the heading to be moved is already cut in the mapping to be held in the mapping storing unit after the editing process of pasting, the mapping regarding the heading which is already cut is no longer included and even when the heading which is already cut is pasted, the data corresponding to this heading can no longer be arranged.

Therefore, the mapping storing designating unit designates storing of the mapping by the mapping offering units to the mapping storing on request by a user. Thereby, the data arrangement unit can refer to the mapping at the timing which a user desires.

Moreover, the data arrangement designating unit detects edition of headings by the heading editing unit and the data arrangement designating unit designates, after edition of heading by the heading editing unit, data arrangement for the data arrangement unit.

Thereby, the data arrangement unit automatically conducts the data arrangement after edition of heading and a user can conduct data arrangement only by editing the headings.

Here, in the edition of headings, a plurality of editing processes are sometimes required to obtain the arrangement of the target heading, for example, as in the case where a couple of editing processes of "cutting" and "pasting" are conducted to move a certain heading. In this case, data arrangement is wasted because the table obtained is not the one finally required even when the data arrangement designating unit automatically executes the data arrangement after each editing process.

Therefore, data arrangement designation is made by the data arrangement designating unit, upon issuance of user request to the data arrangement designating unit. Accordingly, when a user obtains the arrangement of the target heading, data arrangement can be realized and thereby edition of heading can be realized without any useless arrangement.

Moreover, the data arrangement unit comprises an expected data list generating unit for receiving an offered mapping in regard to the table from the mapping offering unit to generate an expected list of data to be arranged in each cell and sorting the expected data in the list depending on possibility of each expected data for arrangement in the cell and a data selecting unit for presenting the list of expected data generated by the expected data list generating unit to a user to select one expected data from the list. The expected data selected by the data selecting unit is used as the data determined by the data arrangement unit.

Thereby, a user is capable of selecting the data, for each cell, from the expected data sorted depending on possibility for entry to such cell and easily determining the arrangement of data.

In addition, the data arrangement unit calculates, for each cell, possibility for entry to such cell regarding each expected data to be arranged in this cell and defines the expected data having the highest possibility as the data determined by the data arrangement unit.

Thereby, a user can full-automatically obtain the adequate data arrangement.

Moreover, the data arrangement unit comprises an expected data list generating unit for receiving an offered mapping in regard to the table from the mapping offering unit to generate an expected list of data to be arranged in each cell and sorting the expected data in the list depending on possibility of each expected data for arrangement in the cell and a data selecting unit for presenting the list of expected data of the data generated by the expected data list generating unit to a user to select one expected data from the list. The data arrangement unit calculates, for each cell, possibility for entry to the cell in regard to each expected data to be arranged in the cell and defines such data as that to be determined by the data arrangement unit when the expected data having the highest possibility is uniquely determined or defines the expected data selected by the data selecting unit as the data to be determined by the data arrangement unit when the expected data having the highest possibility is not determined uniquely.

Thereby, when an expected data uniquely having the highest possibility for entry to the cell exists, such data is automatically arranged to alleviate the load of user and meanwhile if such data is not determined, data can easily be determined by presenting a user the expected data list sorted depending on the possibility for selection.

In addition, possibility for arrangement of data into the cell is calculated, in the mapping in regard to the table offered by the mapping offering unit, with reference to the comparison result whether the set of headings corresponding to the data matches the set of headings corresponding to the cells or not.

Thereby, data having the same set of headings are arranged to realize the table edition in which correspondence between the heading and data is maintained.

Moreover, possibility for arrangement of data in the cell is calculated, in the mapping in regard to the table offered by the mapping offering unit, with reference to the number of elements of product set of the set of headings corresponding to the data and the set of headings corresponding to the cell.

Thereby, if the set of headings corresponding to a data D includes the larger common part with the set of headings corresponding to the cell, D has a higher possibility for arrangement and a certain difference can be given to the possibility in regard to the data where a couple of set does not match.

Moreover, possibility for arrangement of data in the cell is calculated, in the mapping in regard to the table offered by the mapping offering unit, with reference to the result that the number of elements of the set of the headings corresponding to the cell is added to the number of elements of the set of the headings corresponding to the data and then two times of the number of elements of the product set of such two aggregations is subtracted from such added value.

Thereby, even if two or more expected data exist and the common part between the set of headings corresponding to respective data and the set of headings corresponding to cell is same for any expected data, the data having lesser amount of different portion between two aggregations is capable of having the higher possibility for arrangement as the data.

Here, the data appearing frequently in the table before the edition can be assumed, so long as the table is changed to a large extent, to frequently appear even after the edition.

Therefore, possibility for arrangement of data in the cell is calculated with reference to the number of times of appearance of the same data in the mapping offered by the mapping offering unit. Therefore, the data having appeared in the table more frequently is given the higher possibility for arrangement as the data.

Moreover, when there exists a plurality of data having the equal possibility as a result of calculation using a certain reference at the time of obtaining the possibility for arrangement of data in the cell, difference between possibility among data is calculated using another reference.

Thereby, it is also possible to obtain detail difference in possibility among expected data.

Here, when the same data is appearing in a plurality times in the mapping offered by the mapping offering unit, the same data also appearing a plurality of times in the expected data list generated by the expected data list generating unit. A user requires, in the expected data list, the information about "which data exists in which rank of list". In regard to the same data, since same data are arranged in the data cell of table even when any data is selected, a plurality of data existing in the same rank as a result of sorting are useless, except for only one data.

Therefore, when a plurality of data exist the same rank after the expected data list generating unit sorted the list, only one data among such data is left and the other data are deleted. Thereby, the data which is useless for user is deleted to less frequently offer the expected data list.

Moreover, since the expected data list is sorted depending on possibility for entry to the cell, it is assumed here that a user checks the rank in the data selecting unit, namely whether the data having the higher possibility for entry to the cell is selected first or not. In this case, when a plurality of same data exist in the expected data list, the same data are already checked at the time of checking process except for those other than that located first in these data.

Therefore, when a plurality of the same data exist in the list after sorting the list by the expected data list generating unit, the remaining data are deleted, leaving the data located at first in such data as it is. Thereby, the data already checked are no longer checked to save the checking time and thereby more simplified expected data list can be provided.

Moreover, when the heading is deleted in the table edition, if "set of headings" in the mapping before and after the edition is thought, set of headings before edition must consider the set of heading after edition as the subset since the headings are deleted.

Therefore, the data selecting unit does not define the data of a certain pair as the expected data to be arranged in the cell, in each pair of the mapping offered by the mapping offering unit, if the set of headings corresponding to the data does not consider the set of headings corresponding to the cell as the subset. Therefore, the data which should not be arranged when the heading is deleted is not selected as the expected data to alleviate the subsequent process for selecting the expected data.

As explained above, it will be better to change which data should be considered as the expected data to be arranged in the cell depending on the type of edition.

Therefore, the data selecting unit considers a type of the preceding heading edition process just executed as a parameter to define which data should be selected as the expected data to be arranged in the cell. Thereby, the expected data matched to the edition can be selected depending on the edition executed.

Here, it is thought that movement of a certain heading is executed by a couple of editing processes of "Cutting" and "Pasting" in the edition of heading. In the case of executing the edition, in the apparatus where the mapping immediately before the edition is automatically held in the mapping storing unit, the mapping held in the mapping storing unit after execution of the editing operation "Pasting" is obtained by cutting the heading to be moved. Therefore, the mapping in regard to the heading having been cut is no longer included and it is impossible to arrange the data corresponding to the heading even after the heading having been cut is pasted.

Therefore, the mapping offering unit can provide, upon reception of designation for mapping storing for a plurality of times, one or a plurality of mappings by selecting them from the mappings at the time of designation of such mappings. Thereby, it is no longer required to delete, for the latter editing operations, the mapping held for the preceding editing operations and therefore it is possible for the data arrangement unit to refer to the mapping in regard to the condition other than that immediately before the edition.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 shows an example of the table before edition;

FIG. 2 shows an example of the table after edition;

FIG. 4 shows an example of the mapping held by a mapping offering unit;

FIG. 7 shows an example of the mapping to be held by the mapping offering unit;

FIG. 8 shows an example of the table before the data arrangement;

FIG. 9 shows an example of the table in the course of the data arrangement;

FIG. 12 shows an example of the table before the edition;

FIG. 13 shows an example of the mapping held by the mapping offering unit;

FIG. 14 shows an example of the table before data arrangement;

FIG. 15 shows an example of the expected data list;

FIG. 16 shows an example of the expected data list;

FIG. 17 shows an example of the expected data list;

FIG. 18 shows an example of the expected data list;

FIG. 19 shows an example of the table in the course of data arrangement;

FIG. 20 shows an example of the expected data list;

FIG. 21 shows an example of the expected data list;

FIG. 22 shows an example of the expected data list;

FIG. 23 shows an example of the selection designating display by the data selecting unit; and FIG. 24 shows an example of the table in the course of data arrangement.

DESCRIPTION OF THE PREFERRED EMBODIMENTS

A table editing apparatus of the present invention will be explained with reference to the accompanying drawings.

Figure 3:
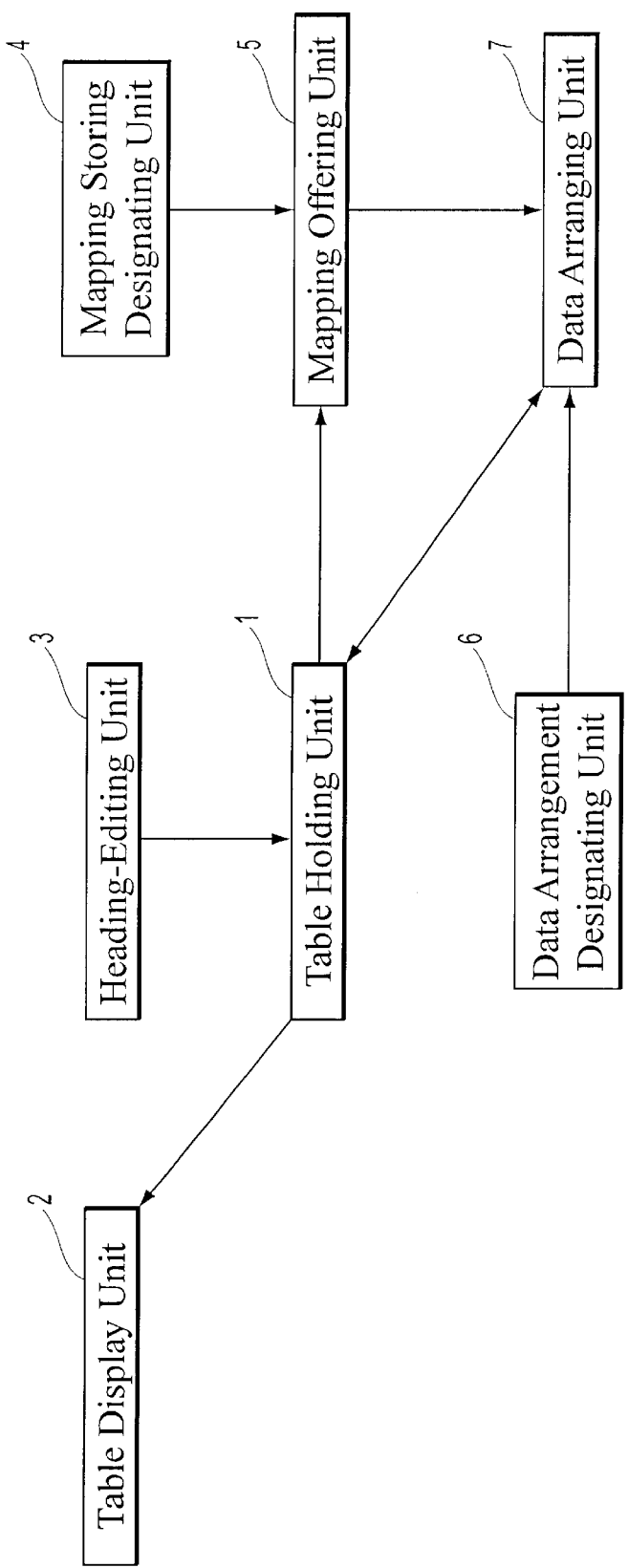
FIG. 3 shows a structure of a table editing apparatus in relation to the first embodiment of the present invention.

FIG. 3 shows a structure of the table editing apparatus in relation to the first embodiment of the present invention.

The table editing apparatus of this embodiment comprises a table display unit 2, a heading editing unit 3, a mapping storing designating unit 4, a mapping offering unit 5, a data arrangement designating unit 6 and a data arrangement unit 7. Arrow marks in the figure indicate flow of data.

The table storing unit 1 holds tables as the object of edition and is provided with a memory for storing relevant table data.

The table display unit 2 is a means for displaying the table stored in the table storing unit 1 to user and is provided with a display unit for outputting the table.

The heading editing unit 3 is a means for accepting the heading editing designation from a user to edit the table stored in the table storing unit 1 and is also provided with an interface for accepting a user input and a function unit for executing the editing process.

The mapping storing designating unit 4 is a means for issuing the mapping storing designation to the mapping offering unit 5 depending on user request and is provided with an interface for accepting a user input and a function unit for outputting storing designation.

The mapping offering unit 5 is a means for accepting the mapping storing designation from the mapping storing designating unit 4, storing, in this timing, the mapping of the table stored in the table storing unit 1 in the format as shown in FIG. 4 and moreover offering the mapping depending on the request from the data arrangement unit 7. Contents of the mapping shown in FIG. 4 have been extracted from the table of FIG. 1 and therefore the table shown in FIG. 1 is stored in the table storing unit 1.

Figure 5:
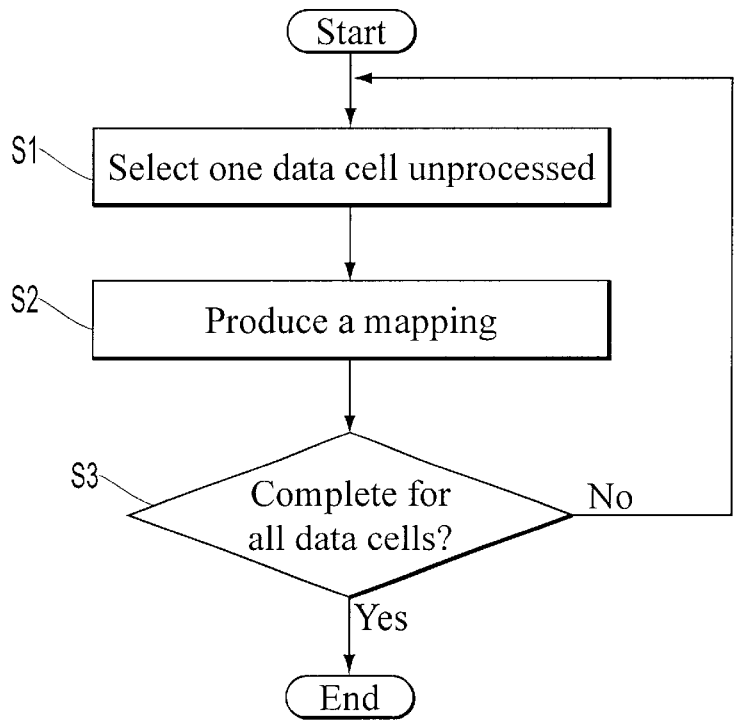
FIG. 5 is a flowchart showing an example of the procedures of the mapping storing process.

In more practical, upon reception of the mapping storing designation, the mapping offering unit 1 stores the mapping in the processing procedures shown in FIG. 5.

First, a cell not yet processed among the cells of the data part of the table stored in the table storing unit 1 is selected (step S1). In the table stored in the table storing unit 1, content of the cell as the heading among the cells having in common the same columns and rows as the selected cell is extracted and a pair of the set of headings obtained and content of the selected cell is stored in the format shown in FIG. 4 to generate a mapping (step S2).

Whether process has been conducted or not is judged for all cells of the data part of the table stored in the table storing unit 1. When the process is completed for all cells, the process for storing the mapping is completed and when there are cells not yet processed, the process explained above is repeated (step S1).

The data arrangement designating unit 6 is a means for issuing the data arrangement designation to the data arrangement unit 7 depending on user request and is provided with an interface for accepting user input and a function unit for outputting the arrangement designation.

The data arrangement unit 7 is a means for accepting the data arrangement designation from the data arrangement designating unit 6 and determining the data to be arranged in the cell, depending on the heading corresponding to the cell and the mapping offered from the mapping offering unit 5 to each cell of the data part of the table stored in the table storing unit 1.

Figure 6:
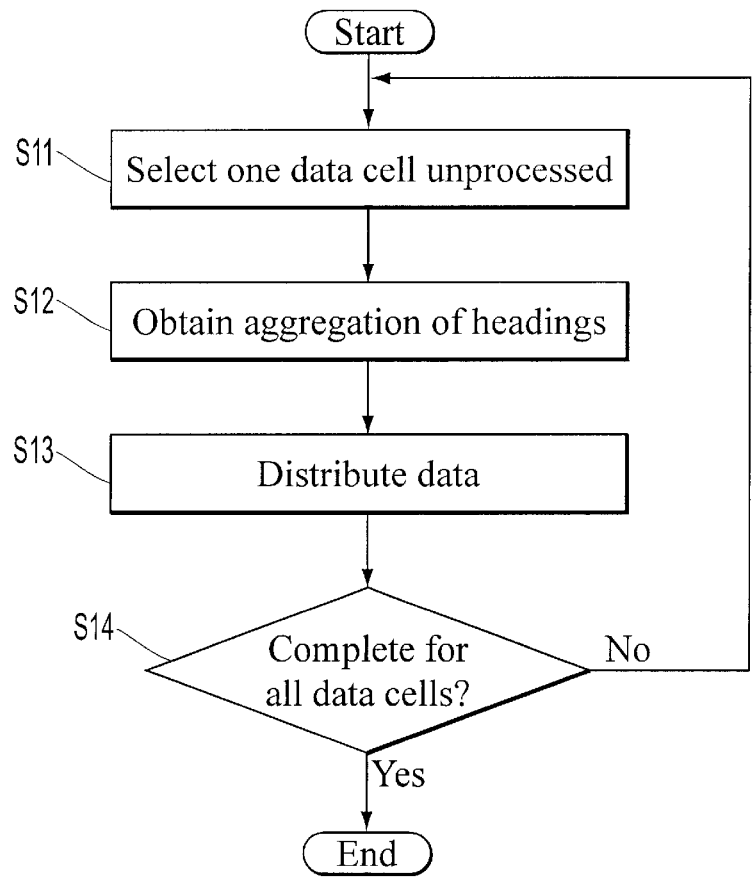
FIG. 6 is a flowchart showing an example of the procedures of the data arrangement process.

In more practical, upon reception of the data arrangement designation, the data arrangement unit 7 arranges the data in the edited table by the processing procedures shown in FIG. 6.

First, one cell not yet processed is selected among the cells of the data part of the table stored in the table holding unit 1 (step S11). In the table stored in the table storing unit 1, content of the cell for the heading among the cells having in common the same columns and rows as the selected cells is extracted and the set of the headings obtained thereby is obtained (step S12).

When a pair including as the element the same set as that of the headings obtained exists in the mapping offered from the mapping offering unit 5, data of this pair is arranged as the content of the cell selected in the step S11 (step S13). Whether process is executed to all cells of the data part of the table stored in the table storing unit 1 or not is judged (step S14). When the process is completed to all cells, data arrangement process is completed and when there are cells not yet processed, above process is repeated (step S11).

Next, how the table editing process is executed by the table editing apparatus of this embodiment will be explained more practically.

First, a user issues a request to the mapping storing designating unit 4 to designate storing of mapping. The mapping storing designating unit 4 having received this request designates storing of mapping to the mapping offering unit 5 and the mapping offering unit 5 starts the mapping storing process, upon reception of the mapping storing designation by the mapping storing designating unit 4.

In the mapping storing process, one cell not yet processed among the cells in the data part of the table (refer to FIG. 1) stored in the table storing unit 1 is selected (step S1). Here, it is assumed that the lowest right cell "Tohoku University" in the data part is selected.

Next, the mapping offering unit 5 extracts content of the heading cell among the cells having in common the same column and row as the selected cells in the table stored in the table storing unit 1 and stores a pair of the set of headings obtained and the content of selected cells in the format shown in FIG. 4 (step S2). Namely, since content of heading of the cell having in common the same column as the selected column is "Miyagi" and content of heading of the cell having in common the same row is "University", the mapping forming a pair of the set of heading {Miyagi, University} and data [Tohoku University] is stored as a result as shown in FIG. 7.

Next, the mapping offering unit 5 judges whether the process has been conducted or not for all cells of the data part of the table stored in the table storing unit 1 (step S3) and repeats the process of step S1 because the process is not yet conducted for all cells in this timing.

When the process is executed for all cells of the data part of the table shown in FIG. 1 as explained above, the mapping shown in FIG. 4 is stored as a result in the mapping offering unit 5.

Thereafter, a user uses the heading editing unit 3 to edit the table of FIG. 1 stored in the table storing unit 1 and edits the heading to the layout table as shown in FIG. 8.

Next, a user issues a request for data arrangement designation to the data arrangement designating unit 6 and the data arrangement designating unit 6 having received this request conducts data arrangement designation to the data arrangement unit 7.

The data arrangement unit 7 starts, upon reception of the data arrangement designation by the data arrangement designating unit 6, the data arrangement process and selects one cell which is not yet processed in the data part of the table stored in the table storing unit 1 (step S11). Here, it is assumed that the right lowest cell in the data part is selected.

Next, the data arrangement unit 7 extracts, in the table stored in the table storing unit 1, the content of the heading cell among the cells having in common the same rows and columns as the selected cells in the step S11 and obtains set of the headings obtained thereby (step S12). Namely, content of the heading cell having in common the same column as the cells selected here is "Miyagi" and content of the heading cell having in common the same row is "University". Therefore, set of the headings obtained is {Miyagi, University}.

Next, when a pair having, as the element, the same set as the set of heading obtained in the step S12 exists in the mapping offered by the mapping offering means 5, the data of this pair is arranged as the content of the cell selected in the step S11 (step S13). Namely, since the same set as the set {Miyagi, University} obtained in the step S12 exists in the mapping shown in FIG. 4 and the data of the pair is "Tohoku University", the data arrangement unit 7 arranges the data in the lower right cell selected in the step S11 and the table shown in FIG. 9 is stored as a result in the table storing unit 9.

Next, the data arrangement unit 7 judges whether the process is conducted or not for all cells of the data part of the table stored in the table storing unit 1 (step S14) and repeats the processes after the step S11 because the process is not yet completed for all cells. When the process is completed for all cells, the table as shown in FIG. 2 is stored as a result in the table storing unit 1.

Figure 10:
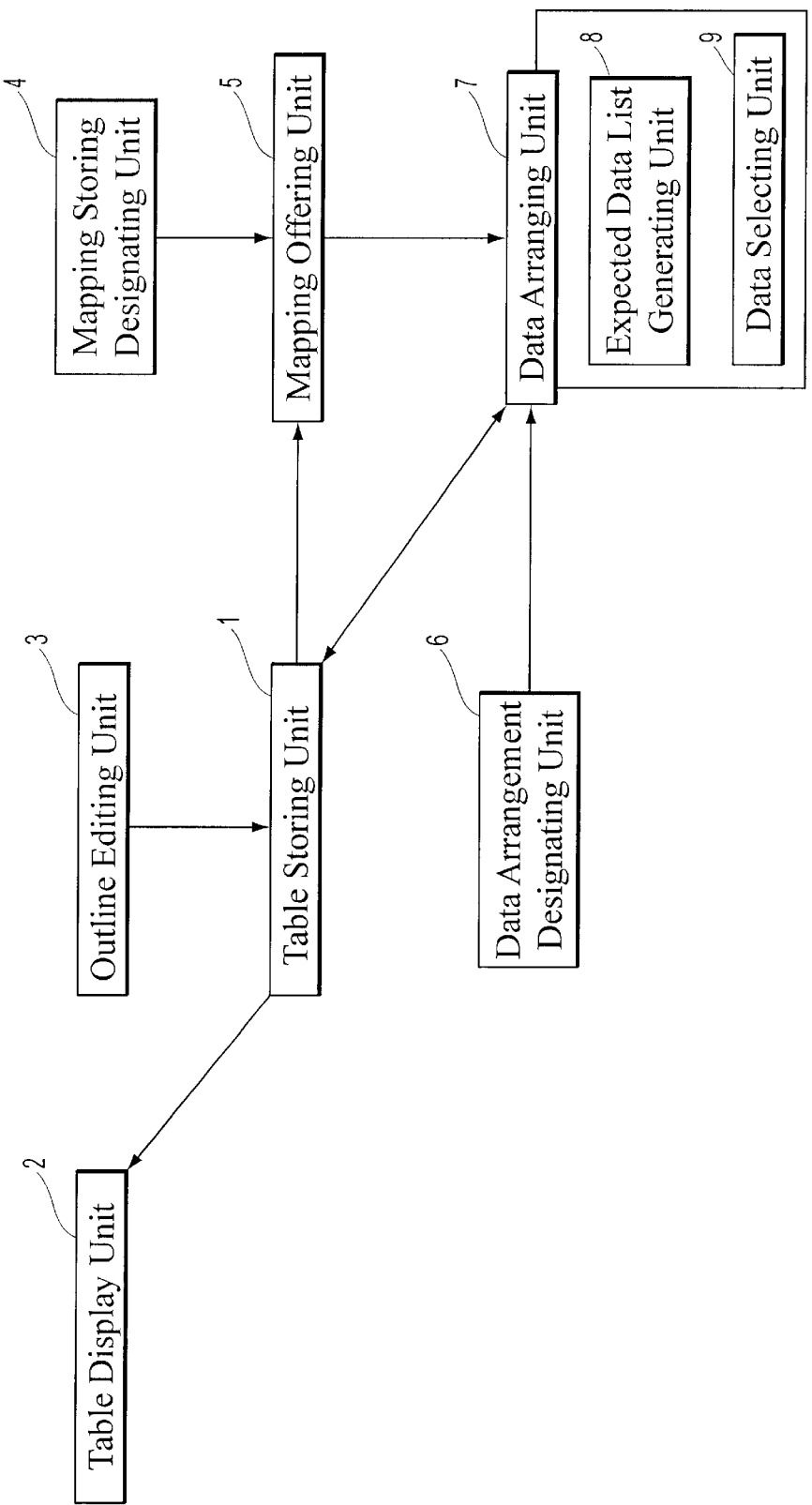
FIG. 10 shows a structure of the table editing apparatus in relation to the second embodiment of the present invention.

FIG. 10 shows a structure of the table editing apparatus in relation to the second embodiment of the present invention. Here, the elements like those in the first embodiment are given the like reference numerals and the same explanation is not repeated.

The table editing apparatus of this embodiment corresponds to the table edition such as addition of new heading and is same as the apparatus of the first embodiment, except for the function of the data arrangement unit 7.

The data arrangement unit 7 of this embodiment further comprises an expected data list generating unit 8 and a data selecting unit 9.

The expected data list generating unit 8 receives offering of the mapping from the mapping offering unit 5 to generate, to each cell, the expected data list to be arranged in the cell from the mapping and the set of heading to such cell and moreover sorts the expected data in the list depending on possibility for arrangement in the cell of each expected data.

In addition, the data selecting unit 9 presents a list of expected data generated by the expected data list generating unit 8 to a user to select only one expected data in the list.

Namely, in this embodiment, possibility for entry to the cell is calculated, to each cell, in regard to each expected data among the data to be arranged in the cell and the expected data having the highest possibility is defined as the data determined by the data arrangement unit 7. When the such data is not determined uniquely, the expected data selected by the data selecting unit 9 is defined as the data determined by the data arrangement unit 7.

Figure 11:
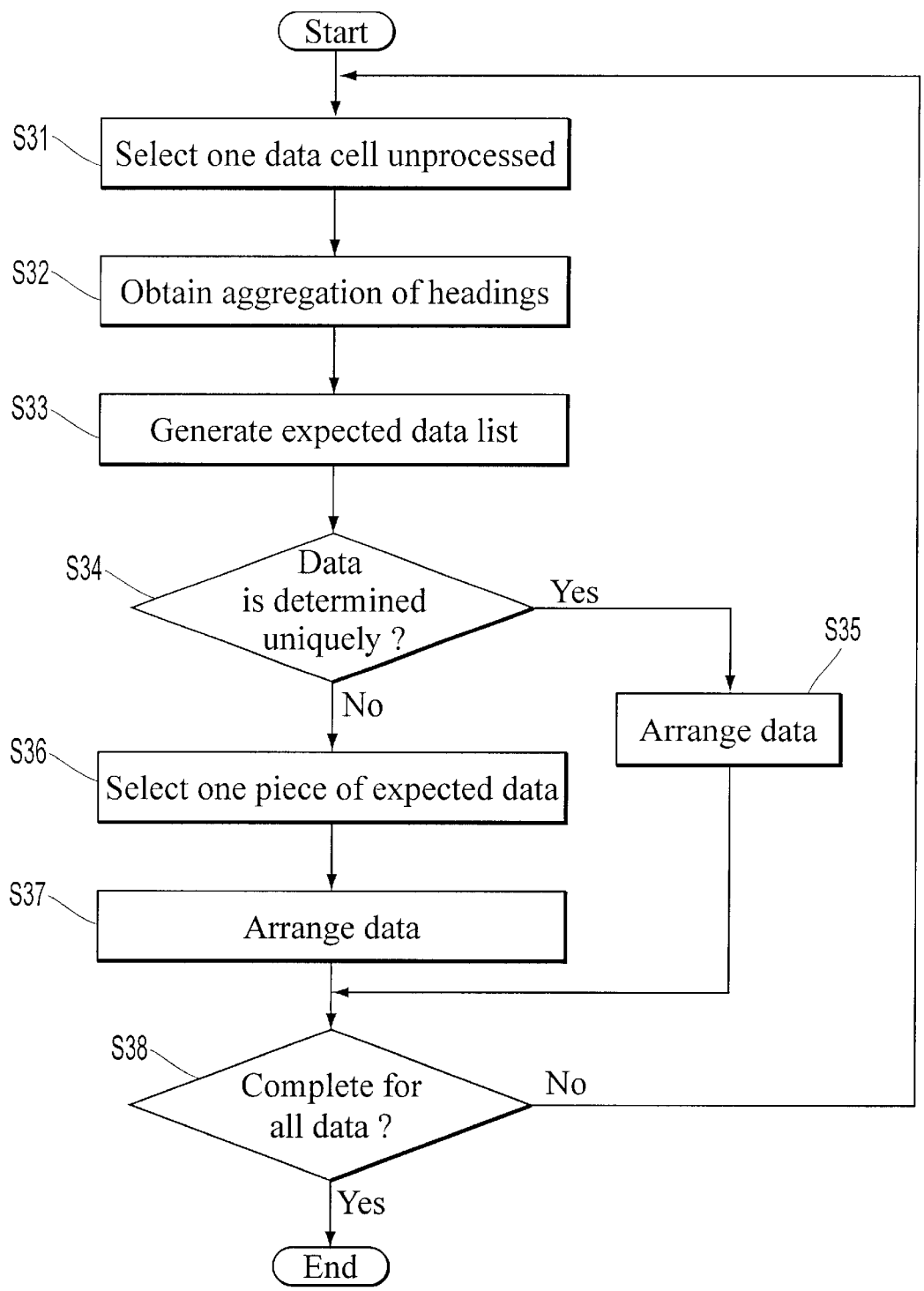
FIG. 11 is a flowchart showing an example of the procedures of the data arrangement process.

The processing procedures from acceptance of the data arrangement designation by the data arrangement unit 7 to completion of data arrangement in the table editing apparatus of this embodiment will be explained with reference to FIG. 11.

First, a cell not yet processed is selected from the cells of the data part of the table stored in the table storing unit 1 (step S31). In the table stored in the table storing unit 1, content of the heading cell of the cells having in common the same column and row as the cell selected in the step S31 to obtain the set of headings obtained thereby(step S32).

Next, the expected data list generating unit 8 generates the expected data list consisting of data of each pair of the mapping offered by the mapping offering unit 5 (step S33).

Namely, in this embodiment, the expected data in this list is sorted in the descending order with reference to the number of elements of the product set of the set of headings forming a pair with the data in the mapping and the set obtained in the step S32. When a plurality of data having the same number of elements of the product set exist, such data is further sorted in the descending order depending on the number of times of the same data to appear in the mapping offered by the mapping offering unit 5. Moreover, when a plurality of same data exist in the same order, only one data is left and the other are deleted.

As a result of sorting, when whether the heading data of the list is determined uniquely or not is judged (step S34) and it is determined, the first order data as a result of sorting is arranged as the content of cell selected in the step S31 (step S35).

Meanwhile, the heading data is not determined uniquely, the data selecting unit 9 presents the list of the expected data to a user for selection of only one expected data from this list (step S36). The data selected by user is arranged as the content of the cell selected in the step S31 (step S37).

Whether the process is conducted for all cells of the data part of the table stored in the table storing unit 1 or not is judged (step S38). When the process is completed for all cells, process of data arrangement is completed and when there is cells not yet processed, above process is repeated (step S31).

Next, how the table editing process is conducted by the table editing apparatus of this embodiment will be explained more practically. In the initial condition, it is assumed that the table shown in FIG. 12 is stored in the table storing unit 1.

First, a user issues a request for the mapping storing designation to the mapping storing designating unit 4. Upon reception of this request, the mapping storing designating unit 4 designates the storing of mapping to the mapping offering unit 5. The mapping offering unit 5 starts, upon reception of the mapping storing designation from the mapping storing designating unit 4, the mapping storing process. This mapping storing process is not described here in detail because it is same as that in the first embodiment, but the mapping shown in FIG. 13 is stored in the mapping offering unit 5.

A user uses the heading editing unit 3 to edit the table of FIG. 12 stored in the table storing unit 1, changes the layout of heading as shown in FIG. 14 and then issues a request to designate the data arrangement to the data arrangement designating unit 6.

The data arrangement designating unit 6 having received this request designates data arrangement to the data arrangement unit 7 and the data arrangement unit 7 starts the data arrangement process.

In this data arrangement process, a cell not yet processed in the cells of the data part in the table stored in the table storing unit 1 is selected (step S31). Here, it is assumed that the left lowest cell in the data part is selected.

Next, content of the heading cell among the cells having in common the same column and row as that of the cell selected in the step S31 in the table stored in the table storing unit 1 is extracted to obtain the set of headings obtained (step S32). Here, content of the heading cell having in common the same column as that of the selected cell is "IPC" and content of the heading cell having in common the same row is "Japanese Published Unexamined Patent Application No. HEI 6-126xx". Therefore, the set of the headings obtained is {IPC, Japanese Published Unexamined Patent Application No. HEI 6-126xx}.

Next, the expected data list generating unit 8 generates the expected data list consisting of the data of each pair of the mapping offered by the mapping offering unit 5 and sorts the expected data in the list with reference to the number of elements of the product set of the set of headings forming a pair with the data in the mapping and the set obtained in the step S32.

When a plurality of data having the same number of elements of the product set exist, these data are sorted in the descending order depending on the number of times of the same data to appear in the expected data list (step S33).

The list before the sorting obtained from the mapping is shown in FIG. 15. Here, the number of elements of the product set of the set {IPC, Japanese Published Unexamined Patent Application No. HEI 6-125xx} forming a pair in the mapping with the data G06F 19/00 and the set obtained in the step S32 is 1 while that for the data "A Corporation" is 0. The number of elements is obtained for all elements and these can be sorted in the descending order as shown in FIG. 16.

Moreover, since the number of elements of product set in three data "G06F 15/22" (data forming a pair with the set of heading {IPC, Japanese Published Unexamined Patent Application No. HEI 6-123xx}), "G06F 15/22" (data forming a pair with the set of heading {IPC, Japanese Published Unexamined Patent Application No. HEI 6-124xx}) and "G06F 19/00" is 1 and the number of elements of the product set of the data "A corporation", "B Corporation", "C Corporation" is 0, these data are further sorted.

The data same as the data "G06F 15/22" appears twice in the mapping and the data same as the data "G06F 19/00" appears once in the mapping. Therefore, when the data is sorted depending on this result, the expected data list shown in FIG. 17 can be obtained. Here, since the same data "G06F 15/22" appears in several times at the heading area of the list, only one is left to delete the other data and the expected data list as shown in FIG. 18 can be obtained finally.

As a result of sorting (step S33), whether the data in the heading area of the list is determined uniquely or not is judged (step S34). Since the data "G06F 15/22" is determined here as the heading data of list, the data "G06F 15/22" determined as the first data by the sorting is arranged as the content of cell selected in the step S31 (step S35). As a result of the subsequent processes, the table obtained in the course of the data arrangement is shown in FIG. 19.

Next, it is judged whether the process has been conducted or not for all cells in the data part of the table stored in the table storing unit 1 (step S38) and process step returns to the process in the step S31 because the process is not yet completed for all cells in this timing.

Here, one cell not yet processed is selected from the cells in the data part of the table stored in the table storing unit 1 (step S31). Here, it is then assumed that the right lower cell in the data part is selected.

In the table stored in the table storing unit 1, content of the heading cell among the cells having in common the same column and row as the cell selected in the step S31 is extracted to obtain the set of headings obtained (step S32). Here, since the content of the heading cell having in common the same column as the selected cell is "Applicant" and the content of the heading cell having in common the same row is "Japanese Published Unexamined Patent Application No. HEI 6-126xx", the set of the headings obtained becomes {Applicant, Japanese Published Unexamined Patent Application No. HEI 6-126xx}.

Next, the expected data list generating unit 8 generates the expected data list consisting of the data of each pair of the mapping offered by the mapping offering unit 5 and then executes the sorting, for the data of this list, in the descending order with reference to the number of elements of the product set of the set of headings forming a pair with the data in the mapping and the set obtained in the step S32. When there are a plurality of data having the same number of elements of the product set, these data are also sorted further in the descending order depending on the number of times of the same data to appear in the expected data list (step S33).

The list before sorting obtained from the mapping is shown in FIG. 15. Here, the number of elements of the product set of the set {Applicant, Japanese Published Unexamined Patent Application No. HEI 6-125xx} of headings forming a pair in the mapping in the data "G06F 19/00" and the set obtained in the step S32 is 0, while that for the data "A Corporation" is 1. These number of elements are obtained for all elements and these are then sorted in the descending order as shown in FIG. 20.

Moreover, the number of elements of the product set of the "A Corporation", "B Corporation" and "C Corporation" is 1 as in the above case and the number of elements of the product set of the data "G06F 15/22" (data forming a pair with the set of headings {IPC, Japanese Published Unexamined Patent Application No. HEI 6-123xx}, "G06F 15/22" (data forming a pair with the set of headings {IPC, Japanese Published Unexamined Patent Application No. HEI 6-124xx} and "G06F 19/00" is 0. Therefore, sorting is further conducted to these data. Since the data same as the data "G06F 15/22" appears twice in the mapping, while the data same as the data "G06F 19/00" appears once in the mapping, the expected data list shown in FIG. 21 can be obtained by sorting the data depending the above result.

Here, since the same data "G06F 15/22" appears for several times as the second order data in the list, when the other data is deleted, leaving only one data, the expected data list as shown in FIG. 22 can finally be obtained.

Here, it is judged whether the heading data of the list is uniquely determined or not as a result of the sorting in the step S33 (step S34).

In this case, since the heading data are "A Corporation", "B Corporation", and "C Corporation" and such heading data is not determined uniquely, the data selecting unit 9 presents the expected data list to a user as shown in FIG. 23 for selection of only one expected data from the list (step S36). Here, it is assumed that a user has selected the data "B Corporation".

Next, the data "B Corporation" selected in the step S36 is arranged as the content of the cell selected in the step S31 (step S37) to obtain the table shown in FIG. 24 as a result.

Then, it is judged (step S38) whether the process has been executed for all cells of the data part of the table stored in the table storing unit 1. When the process is completed for all cells, process of data arrangement is completed and when there are cells not yet processed, above process is repeated (step S31).

The table obtained by adding the heading "Japanese Published Unexamined Patent Application No. HEI 6-126xx" to the table of FIG. 12 can be obtained by completing such data arrangement process.

A explained above, according to the table editing apparatus of the present invention, when the mapping for table (namely, set of pairs and each pair consists of H and D where H is a set of headings and D is a data which corresponds to H) is stored and the heading of table is edited, complicated table can be edited at a low cost by supporting the table edition while keeping the correspondence between the set of headings and data corresponding to such set because the data to be arranged in the cell is determined for each cell of the data which is the part other than the heading of the table depending on the relevant mapping.

What is claimed is:

1. A table editing apparatus that edits a table by using a mapping which is a set of pairs, each pair consisting of a set of headings and corresponding data, comprising:

a heading editing unit for receiving edits to headings, and editing the headings of the table;

a mapping storing designating unit that generates a mapping storing designation, which instructs a mapping offering unit to store the mapping of the table;

a mapping offering unit that receives the mapping storing designation from said mapping storing designating unit, and stores the mapping of the table when the mapping storing designation is accepted;

a data arrangement designating unit that generates a data arrangement designation, which instructs a data arrangement unit to arrange data; and wherein the data arrangement unit receives the data arrangement designation from the data arrangement designating unit, and determines, for each cell having a data part, which is a cell having data other than the headings of the table, how the data should be arranged in the cell depending on the headings corresponding to the cell and the mapping offered by the mapping offering unit.

2. A table editing apparatus according to claim 1, wherein the mapping storing designating unit detects the data arrangement process by the data arrangement unit and the mapping storing designating unit designates, after the data arrangement process, the storing of mapping to the mapping offering unit.

3. A table editing apparatus according to claim 1, wherein the mapping storing designating unit detects the heading editing designation for the heading editing unit and the mapping storing designating unit designates storing of mapping for the mapping offering designating unit before the heading editing unit edits the headings.

4. A table editing apparatus according to claim 1, wherein the mapping storing designating unit designates storing of mapping in response to the user request.

5. A table editing apparatus according to claim 1, wherein the data arrangement designating unit detects the heading editing process by the heading editing unit and the data arrangement designating unit designates data arrangement for the data arrangement unit after the heading editing process by the heading editing unit.

6. A table editing apparatus according to claim 1, wherein the data arrangement is designated by the data arrangement designating unit in response to user request.

7. A table editing apparatus according to claim 1, wherein the data arrangement unit comprises:

an expected data list generating unit for receiving the mapping from the mapping offering unit to generate, to each cell of the data part of the table, an expected data list to be arranged in the cell from the mapping and set of headings to the cells, and sorting the expected data in the list depending on the possibility for arrangement in the cell of each expected data;

and a data selecting unit for presenting to a user the expected data list generated by the expected data list generating unit whereby a user can select only one expected data from the list, in order to designate the expected data selected by the data selecting unit, as the data determined by the data arrangement unit.

8. A table editing apparatus according to claim 1, wherein the data arrangement unit calculates, to each cell of the data part of table, possibility for entry to the cell regarding each expected data to be arranged in the cell and defines the expected data having highest possibility as the data to be determined by the data arrangement unit.

9. A table editing apparatus according to claim 1, wherein the data arrangement unit comprises:

an expected data list generating unit for receiving the mapping from the mapping offering unit to generate, to each cell of the data part of the table, the expected data list be arranged in the cell from the mapping and set of headings to the cell, and sorting the expected data in the list depending on a possibility for arrangement in the cell of each expected data; and a data selecting unit for presenting, to a user, the expected data list generated by the expected data list generating unit, whereby a user can select only one expected data from the list, and whereby the data arrangement unit calculates, to each cell, possibility for entry to the cell of each expected data of the data to be arranged in the cell and defines such data as the data to be determined by the data arrangement unit when the expected data having the highest possibility is uniquely determined and defines the expected data selected by the data selecting unit as the data to be determined by the data arrangement unit when such expected data having the highest possibility is not uniquely determined.

10. A table editing apparatus according to claim 7, wherein possibility for arrangement of data in the cell is calculated, in the mapping offered by the mapping offering unit, with reference to whether the set of data and corresponding headings is identical to the set of headings corresponding to the cell or not.

11. A table editing apparatus according to claim 7, wherein possibility for arrangement of data in the cell is calculated, in the mapping offered by the mapping offering unit, with reference to the number of elements of a product set of the set of headings corresponding to the data and the set of headings corresponding to the cell.

12. A table editing apparatus according to claim 7, wherein possibility for arrangement of data in the cell is calculated, in the mapping offered by the mapping offering unit, with reference to a result obtained by adding a number of elements of the set of headings corresponding to the cell to a number of elements of the set of headings corresponding to the data and then substracting two times of a number of elements of a product set of such two sets from such added value.

13. A table editing apparatus according to claim 7, wherein possibility for arrangement of data in the cell is calculated with reference to a number of times the same data appears in the mapping offered by the mapping offering unit.

14. A table editing apparatus according to claim 7, wherein when a plurality of data having an equal possibility are detected to exist as a result of calculation for possibility using a certain reference on the occasion of obtaining possibility for arrangement of data into the cell, difference between possibility of these data can be measured by calculating the possibility using another reference.

15. A table editing apparatus according to claim 7, wherein when a plurality of same data exist in the same order on the occasion of sorting the list by the expected data list generating unit, only one data among these data are left as it is, deleting a remaining data.

16. A table editing apparatus according to claim 7, wherein when a plurality of same data are detected to exist in the list on the occasion of sorting the list by the expected data list generating unit, the data appearing first in the list among the data is left as it is and the remaining data is deleted.

17. A table editing apparatus according to claim 7, wherein the data selecting unit does not consider data of a pair as the expected data to be arranged in the cell if the set of headings of a pair does not consider the set of headings corresponding to the cell as the subset in each pair in the mapping offered by the mapping offering unit.

18. A table editing apparatus according to claim 7, wherein the data selecting unit defines what preceding heading edition has been conducted before as the parameter for defining the data as a expected data to be arranged in the cell.

19. A table editing apparatus according to claim 1, wherein the mapping offering unit is capable of offering, upon reception of the mapping storing designation for a plurality of times, one or more mappings by selecting such mappings from the mappings in respective designation times.

* * * * *